United States Patent
Kumaki

(10) Patent No.: US 7,356,333 B2
(45) Date of Patent: Apr. 8, 2008

(54) WIRELESS COMMUNICATION APPARATUS AND WIRELESS COMMUNICATION METHOD

(75) Inventor: Yoshinari Kumaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 61 days.

(21) Appl. No.: 11/170,172

(22) Filed: Jun. 30, 2005

(65) Prior Publication Data

US 2006/0003756 A1    Jan. 5, 2006

(30) Foreign Application Priority Data

Jun. 30, 2004   (JP)   ............. P.2004-194681

(51) Int. Cl.
*H04M 3/00*   (2006.01)
(52) U.S. Cl. ............ 455/418; 455/435.1; 455/419; 455/420; 455/422.1; 455/438; 370/338
(58) Field of Classification Search ............ 455/418, 455/435.1, 420, 422.1, 438; 320/338; 453/419
See application file for complete search history.

(56) References Cited

U.S. PATENT DOCUMENTS

| | | | |
|---|---|---|---|
| 2002/0032748 A1* | 3/2002 | Myojo | 709/217 |
| 2004/0003060 A1* | 1/2004 | Asoh et al. | 709/220 |
| 2004/0068653 A1* | 4/2004 | Fascenda | 713/168 |
| 2004/0095916 A1* | 5/2004 | Maki et al. | 370/338 |
| 2005/0020262 A1* | 1/2005 | Kim | 455/435.1 |
| 2006/0206592 A1* | 9/2006 | Fujii et al. | 709/220 |

FOREIGN PATENT DOCUMENTS

JP    2001-197150    7/2001

* cited by examiner

*Primary Examiner*—David Q. Nguyen
(74) *Attorney, Agent, or Firm*—Finnegan, Henderson, Farabow, Garrett & Dunner, L.L.P.

(57) ABSTRACT

A wireless communication apparatus includes: a communication unit that communicates with a communication equipment on a wireless network; and a control unit that controls the communication unit to transmit a beacon frame of a radio signal carrying at least equipment identification information to the communication equipment and to transmit content information to the communication equipment when a connection request is received from the communication equipment.

12 Claims, 20 Drawing Sheets

CACHE TABLE STRUCTURE EXAMPLE

| PRODUCT NAME | MANUFACTURING NUMBER | FUNCTION (CONNECTION STATE) | RADIO CHANNEL | MAC ADDRESS | IP ADDRESS | RESOURCE USE STATE |
|---|---|---|---|---|---|---|
| WTT1 | TAP-5900 | • AP<br>• RECORDER<br>• DVHS | CH1 | A1 | B1 | RECORDER |
| WTT2 | TAP-5800 | • AP<br>• NAS | CH2 | A2 | B2 | |
| WC1 | TAP-5500 | • AP<br>• CAMERA | CH3 | A3 | B3 | CAMERA |

US 7,356,333 B2

WIRELESS COMMUNICATION APPARATUS AND WIRELESS COMMUNICATION METHOD

RELATED APPLICATIONS

The present disclosure relates to the subject matter contained in Japanese Patent Application No. 2004-194681 filed on Jun. 30, 2004, which is incorporated herein by reference in its entirety.

BACKGROUND OF The INVENTION

1. Field of the Invention

The present invention relates to a wireless communication apparatus of a wireless LAN (Local Area Network), etc., and in particular to a wireless communication apparatus and a wireless communication method for transferring comparatively large-capacity data such as audio video content at high speed.

2. Description of the Related Art

Recently, a digital signal communication apparatus of a wireless LAN, for example, has been widely used with widespread use of digital equipments. As such a wireless communication apparatus, a wireless communication apparatus complying with the communication protocol of IEEE802.11, for example, is known.

In a communication protocol of 'IEEE802.11 Specification Version 2' described in a document "WPA for IEEE802.11 Specification Version 2," communications between an access point AP and a station STA is performed, after connection processing is performed in accordance with UPnP (Universal Plug And Play) protocol, for example, so that the IP addresses are exchanged and then equipment information, function information, state information, and the like are acquired.

SUMMARY OF The INVENTION

However, in the related art described above, equipment identification information of each wireless equipment (product name), function information, and information of the resource use state, etc., concerning a plurality of access points APs cannot be obtained from a station STA before the station STA connects to each access point AP. In the related art, whether or not service using the equipment is available cannot be known until the station STA connects to the access point AP; trouble such that fruitless wireless connection is made or that the station STA connects to an access point AP not having the necessary function occurs.

That is, to obtain the information, the user must operate the wireless communication apparatus of the station STA to perform connection processing to the access points APs one at a time for collecting information concerning the access point AP and then must select the wireless communication apparatus of the access point AP matching the user's desire and make a transition to communication processing of content reception, etc. Thus, there is a problem in the related art that the user must perform such intricate operation.

The present invention provides a wireless communication apparatus for automatically supplying information such as equipment information of a plurality of access points required for access point selection to a station.

According to a first aspect of the invention, there is provided a wireless communication apparatus including: a communication unit that communicates with a communication equipment on a wireless network; and a control unit that controls the communication unit to transmit a beacon frame of a radio signal carrying equipment identification information to the communication equipment and to transmit content information to the communication equipment when a connection request is received from the communication equipment.

According to a second aspect of the invention, there is provided a wireless communication apparatus including: a communication unit that communicates with a communication equipment on a wireless network; and a control unit that controls the communication unit to receive a b beacon frame of a radio signal containing equipment identification information from the communication equipment on the wireless network, to generate and output a display signal for displaying the equipment identification information, and to receive content information from the communication equipment when a connection request to the communication equipment is input.

According to a third aspect of the invention, there is provided a method for providing a wireless communication with a communication equipment on a wireless network, the method including: transmitting a beacon frame of a radio signal carrying at least equipment identification information to the communication equipment; and transmitting content information to the communication equipment when a connection request is received from the communication equipment.

DETAILED DESCRIPTION OF THE EMBODIMENT

Hereinafter, embodiments of the invention will be described by reference to the drawings in detail.

A wireless communication apparatus of one embodiment of the invention will be discussed below in detail with the accompanying drawings using an example of a wireless AV transmission server (AP) 105 and a wireless AV transmission adaptor (STA) 101.

Wireless AV Transmission Server: Configuration of AP1

To begin with, the configuration of the wireless AV transmission server AP of a wireless communication apparatus associated with the wireless AV transmission adaptor STA will be discussed with the accompanying drawings. The wireless communication apparatus according to one embodiment of the invention can be implemented in any of various forms. By way of example, the configuration of the wireless AV transmission server AP of one component of a transmission system made up of the wireless AV transmission server AP and the wireless AV transmission adaptor STA will be discussed below in detail with the accompanying drawings.

Figure 1:
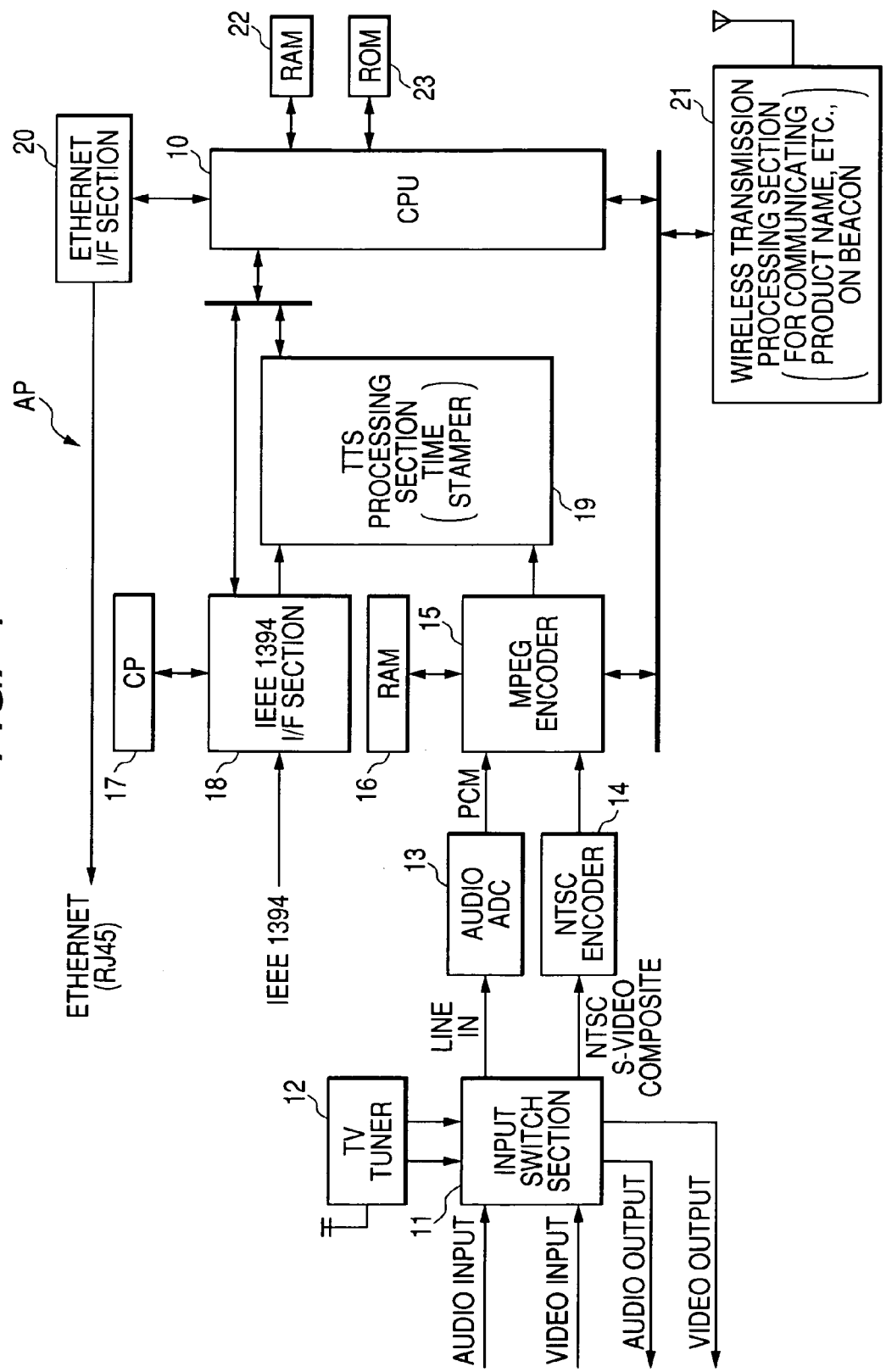
FIG. 1 is a block diagram to show a configuration example of a wireless communication apparatus (AP) according to one embodiment of the invention.

The wireless AV transmission server AP1 transmits at least content information (video information) to the wireless AV transmission adaptor STA. The wireless AV transmission server AP has a CPU 10 for controlling the whole server, RAM 22 and ROM 23 connected to the CPU 10 by a data bus, an input switch section 11 to which a hard disk recorder, etc., for example is connected for receiving audio input and video input and to which a TV tuner section 12 is connected for outputting audio and video, an audio ADC 13 to which line in is supplied from the input switch section 11 for converting an analog audio signal into a digital audio signal, an NTSC decoder 14 for supplying NTSC, S-video, composite, etc., from the input switch section 11, an MPEG encoder 15 for receiving outputs of the audio ADC 13 and the NTSC decoder 14 and converting the outputs into MPEG data, RAM 16 connected to the MPEG encoder 15, and a TTS processing (time stamper) section 19 connected to the data bus for matching the timings of signals at the communication time, as shown in FIG. 1.

The wireless AV transmission adaptor STA has an Ethernet (registered trademark) I/F section 20 for conducting communications in conformity with Ethernet (registered trademark) protocol, an IEEE1394 I/F section 18 for conducting communications in conformity with IEEE1394 protocol, a copyright protection section 17 connected to the IEEE1394 I/F section 18, and a wireless transmission processing section 21 for conducting wireless communications in conformity with a wireless protocol, such as IEEE802.11, for example. The wireless transmission processing section 21 has a transmission function of information of a product name, etc., on a beacon as described later in detail.

Figure 5:
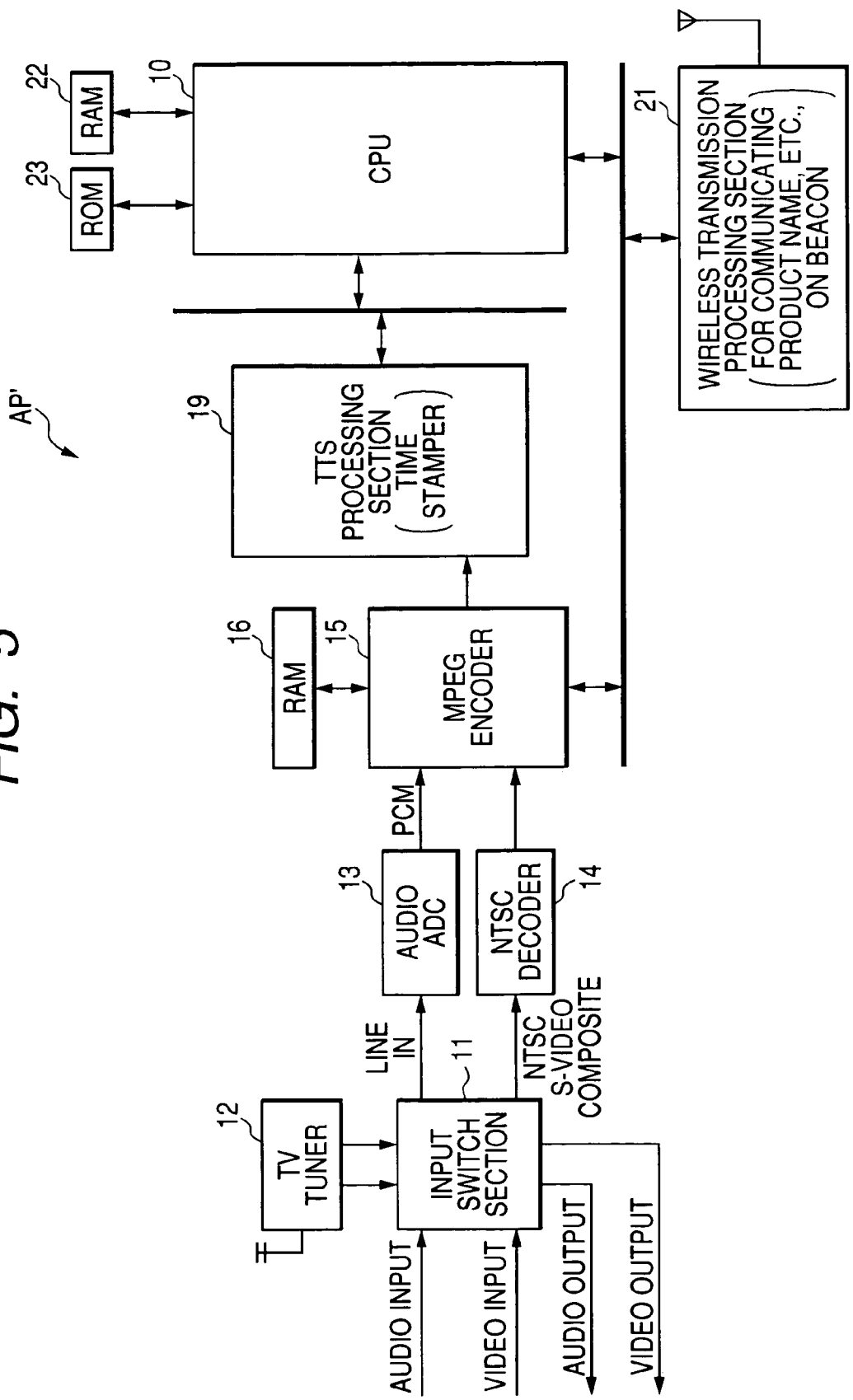
FIG. 5 is a block diagram to show another configuration example of the wireless communication apparatus (AP) according to the embodiment.
Figure 6:
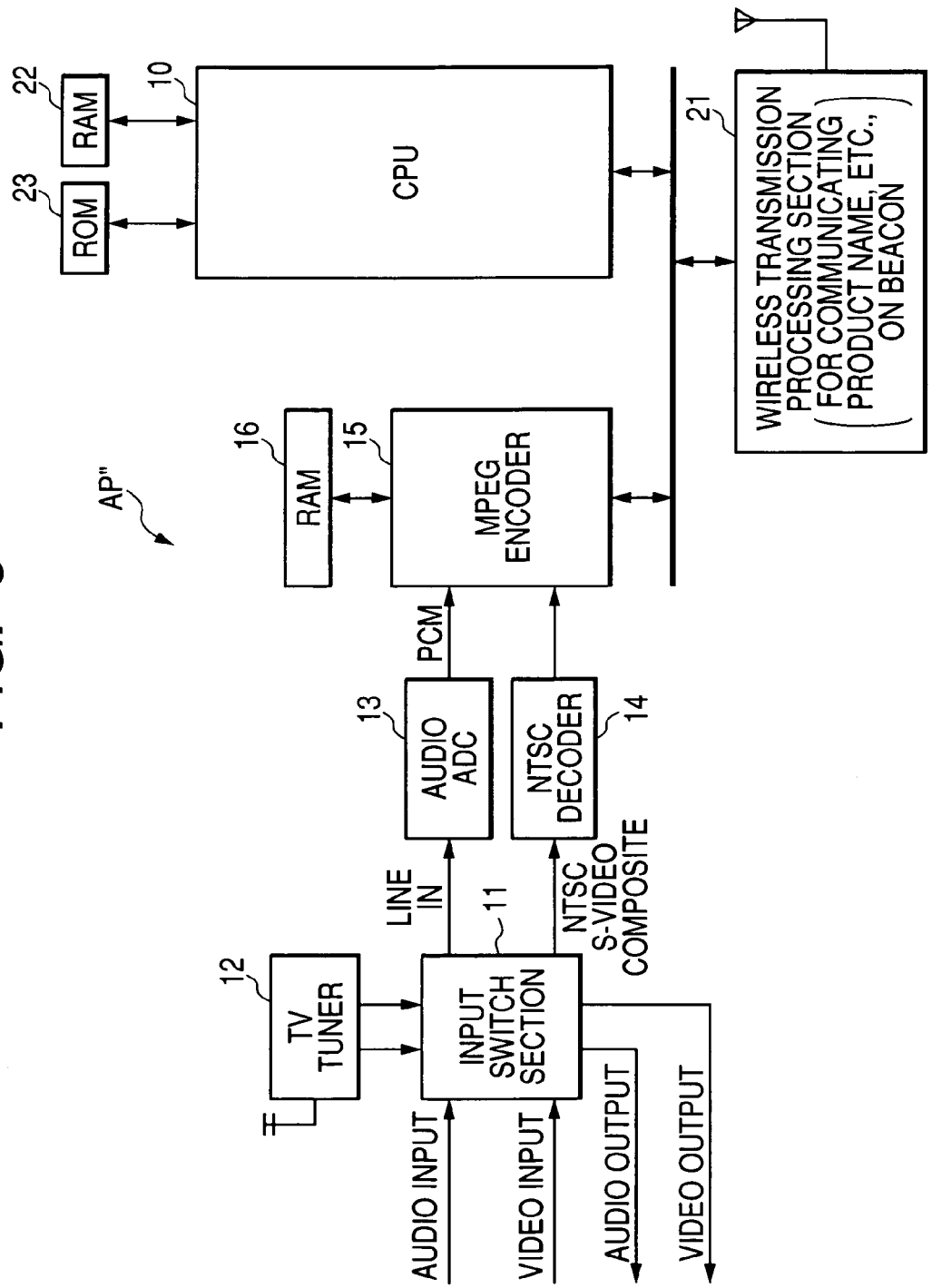
FIG. 6 is a block diagram to show another configuration example of the wireless communication apparatus (AP) according to the embodiment.

FIGS. 5 and 6 show other configuration examples of wireless AV transmission server. That is, a wireless AV transmission server AP' in FIG. 5 does not have the Ethernet (registered trademark) I/F section 20, the IEEE1394 I/F section 18, etc. A wireless AV transmission server AP" in FIG. 6 does not have the TTS processing (time stamper) section 19, either. In this case, the TTS (time stamper) processing is performed in any of the MPEG encoder 15, the CPU 16, or the wireless transmission processing section 21.

Configuration of Wireless Transmission Processing Section 21

Figure 3:
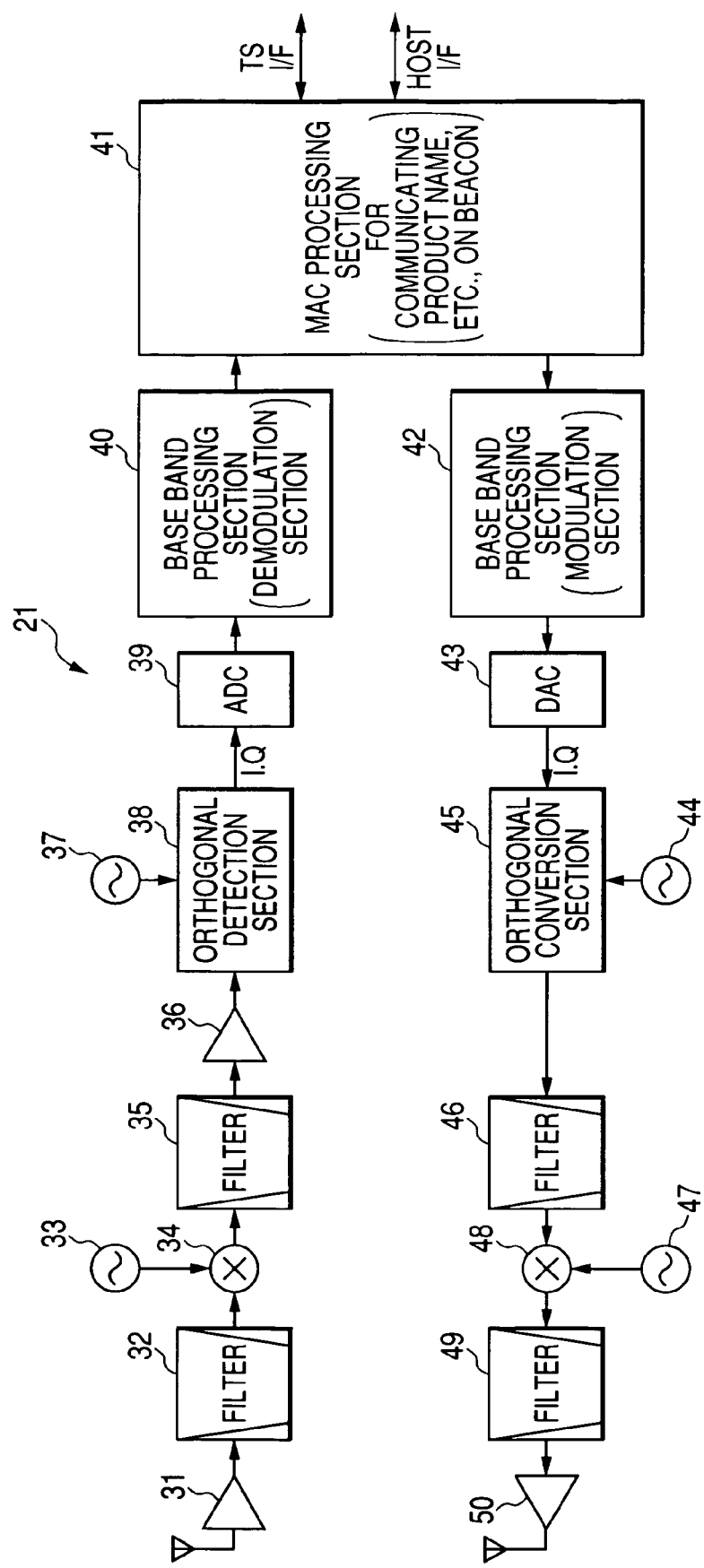
FIG. 3 is a block diagram to show a configuration example of a wireless transmission processing section of the wireless communication apparatus (AP) according to the embodiment.

The wireless transmission processing section 21 has a low noise amplifier 31 for receiving an external radio signal through an antenna, a filter 32 connected to the low noise amplifier 31, an adder 34 for receiving output of the filter 32 and output of a radio frequency generator 33, a filter 35 for receiving output of the adder 34, and an automatic gain control unit 36 for receiving output of the filter 35 and automatically controlling a gain as reception processing components, as shown in FIG. 3. The wireless transmission processing section 21 further has an orthogonal detection section 38 for receiving output of the automatic gain control unit 36 and output of an intermediate frequency generator 37, an A/D conversion section 39 for converting analog output of the orthogonal detection section 38 into digital form, a base band processing section (demodulation section) 40 for demodulating output of the A/D conversion section 39, and a media access control processing section 41 for receiving output of the base band processing section 40 and associating communicating processing to each medium. The media access control processing section 41 has a function of transmitting information of the product name, etc., on a beacon frame described later. The wireless transmission processing section 21 further has a base band processing section (modulation section) 42 for receiving output of the media access control processing section 41, a D/A converter 43 for receiving output of the base band processing section 42 and converting the digital output into analog form, and an orthogonal conversion section 45 for receiving output of the D/A converter 43 and output of an intermediate frequency generator 44 as transmission processing components. The wireless transmission processing section 21 further has a filter 46 for receiving output from the orthogonal conversion section 45, an adder 48 for adding output of the filter 46 and output of a radio frequency generator 47, a filter 49 for receiving output of the adder 48, and a high power amplifier 50 for receiving output of the filter 49 and amplifying a radio signal, and outputs the amplified radio signal from the antenna.

Wireless AV Transmission Adaptor: Configuration of STA

Next, a configuration example of the wireless communication apparatus according to the embodiment of the invention will be discussed below with the accompanying drawings.

Figure 4:
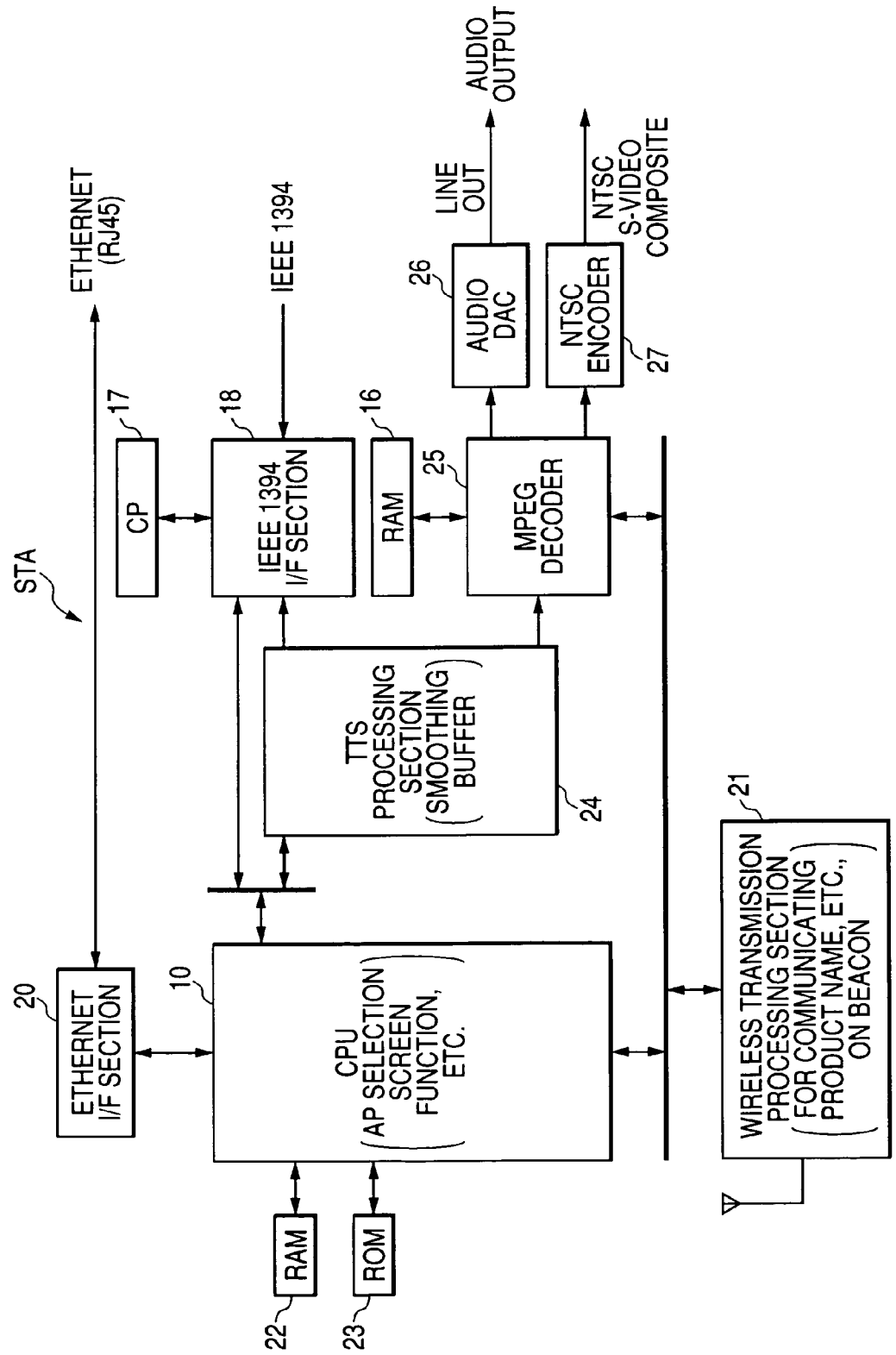
FIG. 4 is a block diagram to show a configuration example of a wireless communication apparatus (STA) according to the embodiment.

The wireless AV transmission adaptor STA as an example of the wireless communication apparatus according to the embodiment of the invention has a CPU 10 for controlling the whole server, RAM 22 and ROM 23 connected to the CPU 10 by a data bus, RAM 16 connected to the data bus, and a TTS processing section (smoothing buffer) 24 connected to the data bus for matching (shifter-absorbing) the timings of signals at the communication time, as shown in FIG. 4. The wireless AV transmission adaptor STA also has an MPEG decoder 25 connected to the data bus for converting output of the TTS processing section 24 into MPEG data, an audio DA converter 26 connected to the MPEG decoder 25 for particularly converting a digital audio signal into an analog audio signal, and an NTSC encoder 27 for performing NTSC encode processing.

The wireless AV transmission adaptor STA further has an Ethernet (registered trademark) I/F section 20 for conducting communications in conformity with Ethernet (registered trademark) protocol, an IEEE1394 I/F section 18 for conducting communications in conformity with IEEE1394 protocol, a copyright protection section 17 connected to the IEEE1394 I/F section 18, and a wireless transmission processing section 21 for conducting wireless communications in conformity with a wireless protocol, such as IEEE802.11, for example, as communication functions, and communicates the product name, etc., on a beacon as described later.

System Configuration

Figure 2:
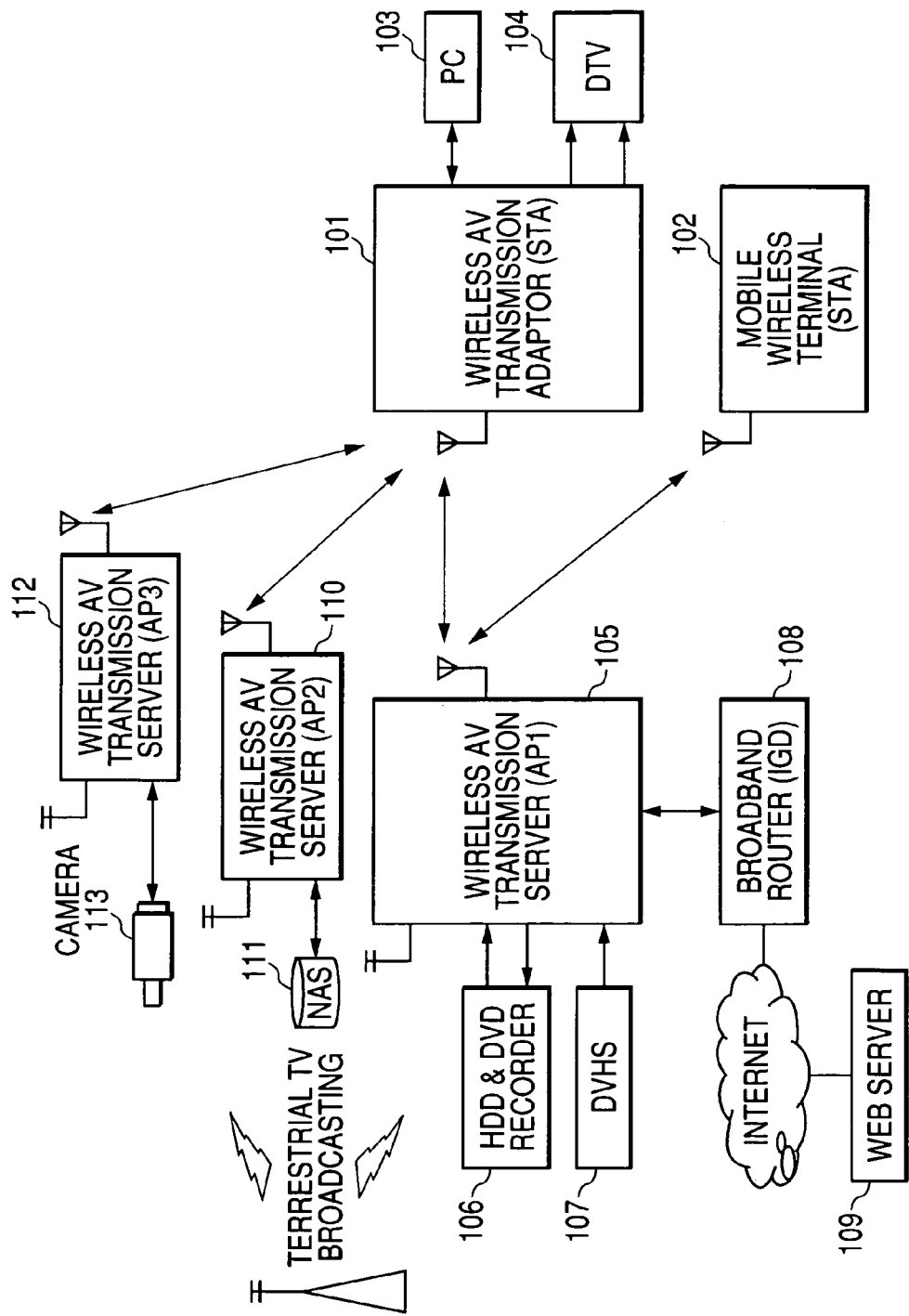
FIG. 2 is a system drawing to show an example of a network where the wireless communication apparatus (AP) according to the embodiment is used.

The wireless AV transmission server AP1 and the wireless AV transmission adaptor STA having the configurations make up a communication system as shown in FIG. 2. As shown in the figure, the communication system has the wireless AV transmission adaptor (STA) 101 and a PC (Personal Computer) 103 and a digital TV 104, for example, connected to the wireless AV transmission adaptor (STA) 101 as the reception side (transmission is also possible). At this time, the wireless AV transmission adaptor (STA) 101 may have the form of a PC card, etc., inserted into the PC 103 or may take the form of a communication module incorporated in the PC 103 or the digital TV 104.

The communication system further includes a mobile wireless terminal (STA) 102 as the reception side (transmission is also possible). The mobile wireless terminal (STA) 102 may be a PDA, a mobile telephone, or the like, for example.

The communication system further has the wireless AV transmission server (AP1) 105, a wireless AV transmission server (AP2) 110, and a wireless AV transmission server (AP3) 112 as the transmission side (reception is also possible). For example, a hard disk and DVD recorder 106, a digital video recorder 107, and a broadband router 108 are connected to the wireless AV transmission server (AP1) 105, and a Web server 109 is connected to the broadband router 108 through the Internet. Further, the wireless AV transmission server (AP2) 110 is connected to an NAS 111, etc., for receiving terrestrial TV broadcasting, etc., for example. Further, the wireless AV transmission server (AP3) 112 is connected to a digital TV camera 113, for example, for transmitting video information.

Operation

Between the wireless AV transmission server (AP1) 105 and the wireless AV transmission adaptor (STA) 101, for example, content data, etc., supplied from the HDD/DVD recorder 106 is transmitted through the wireless AV transmission server (AP1) 105 to the wireless AV transmission adaptor (STA) 101 by radio signal. In the wireless AV transmission adaptor (STA) 101, the wireless transmission processing section 21 receives the radio signal in conformity with the protocol such as IEEE802.11, for example, and supplies the radio signal to the MPEG decoder 25 in sequence. The content signal provided by the MPEG decoder 25 further undergoes conversion processing of the audio DA converter 26, the NTSC encoder 27, etc., and then is output through an output terminal for screen display on the digital TV shown in FIG. 3, for example.

Scanning Processing Using a Beacon Frame

Next, scanning processing using a beacon frame of one embodiment of the invention will be discussed below with the accompanying drawings. The scanning processing mentioned here refers processing of automatically scanning the beacon frame transmitted from the wireless AV transmission server (AP1 to AP3), etc., by the wireless AV transmission adaptor (STA) for acquiring information provided by the wireless AV transmission server (AP) thereby eliminating the need for the user to connect to one wireless AV transmission server (AP) at a time from the wireless AV transmission adaptor (STA) for collecting information.

Figure 7:
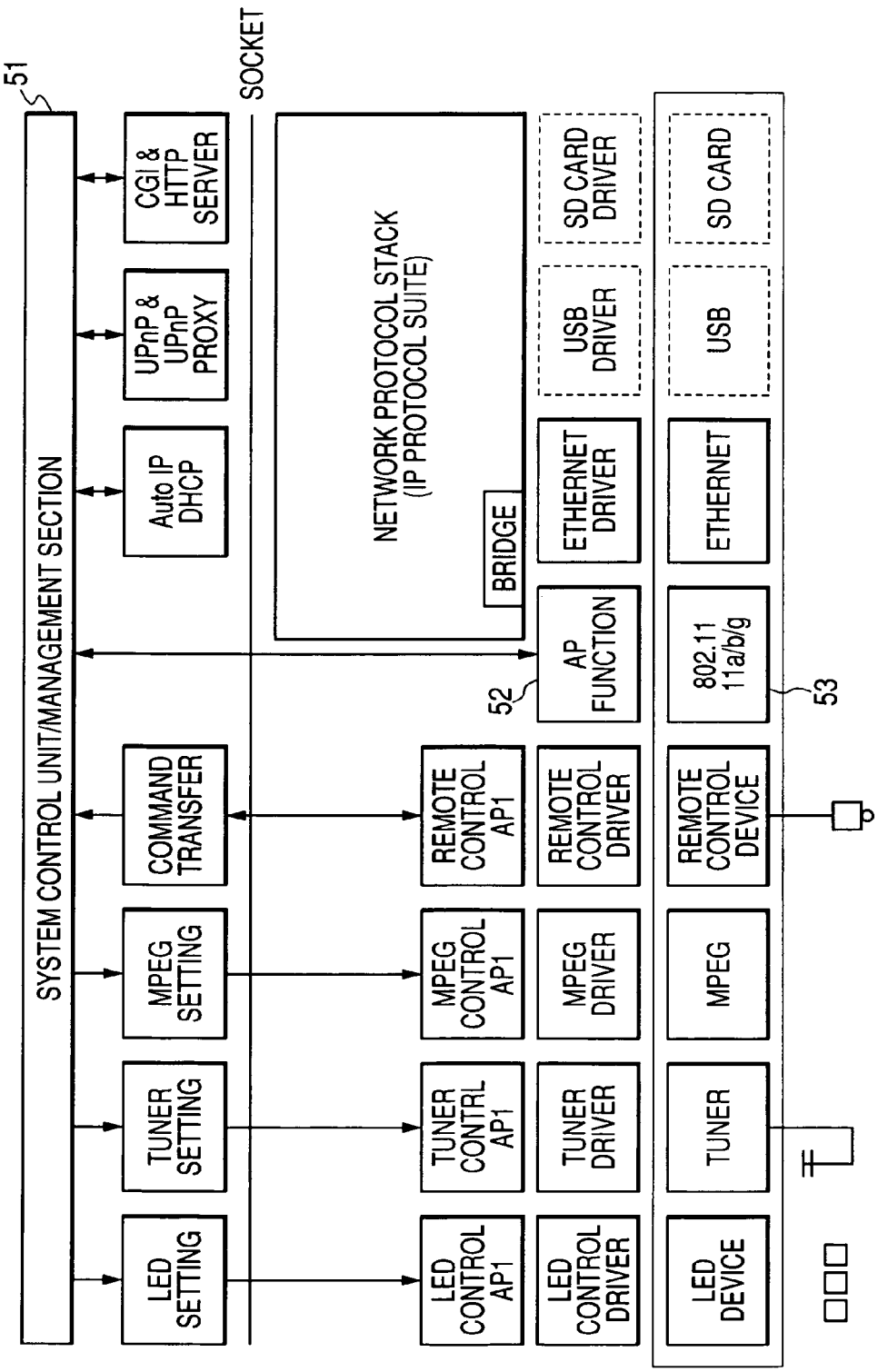
FIG. 7 is a block diagram to show an overview example of the functions of the wireless communication apparatus (AP) according to the embodiment.
Figure 8:
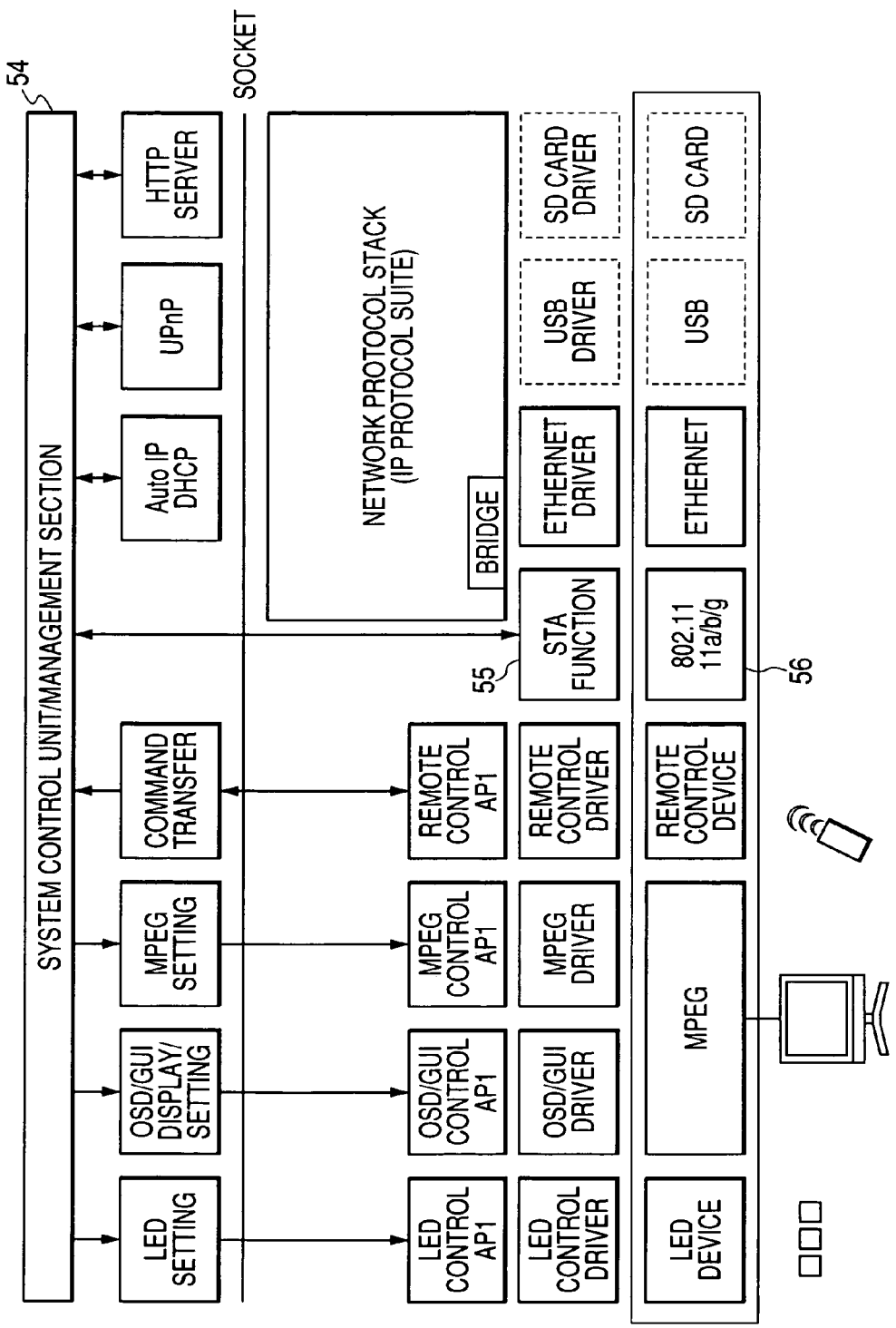
FIG. 8 is a block diagram to show an overview example of the functions of the wireless communication apparatus (STA) according to the embodiment.
Figure 9:
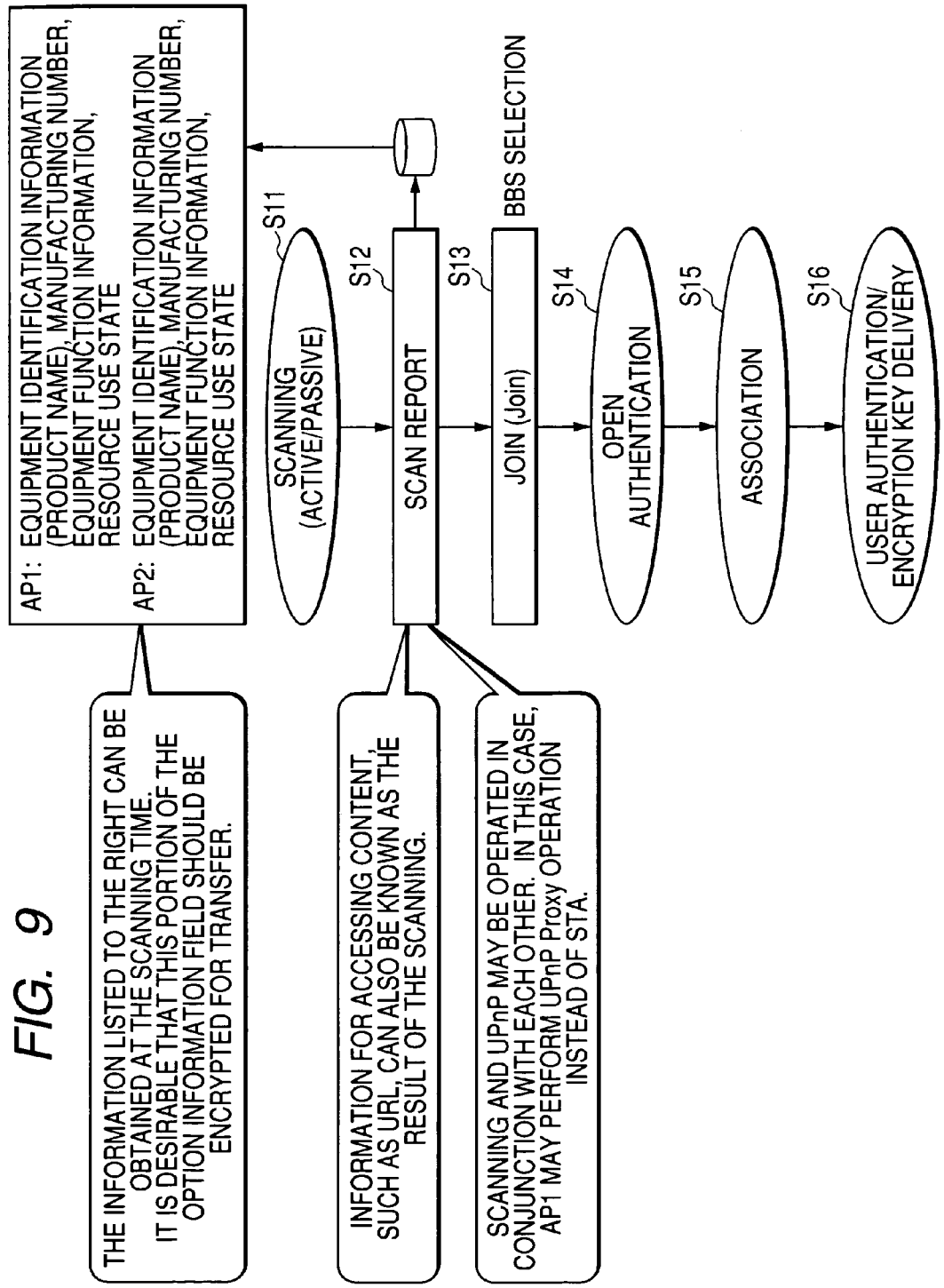
FIG. 9 is a flowchart to show an overview of an example of communication processing of the wireless communication apparatus (AP and STA) according to the embodiment.
Figure 10:
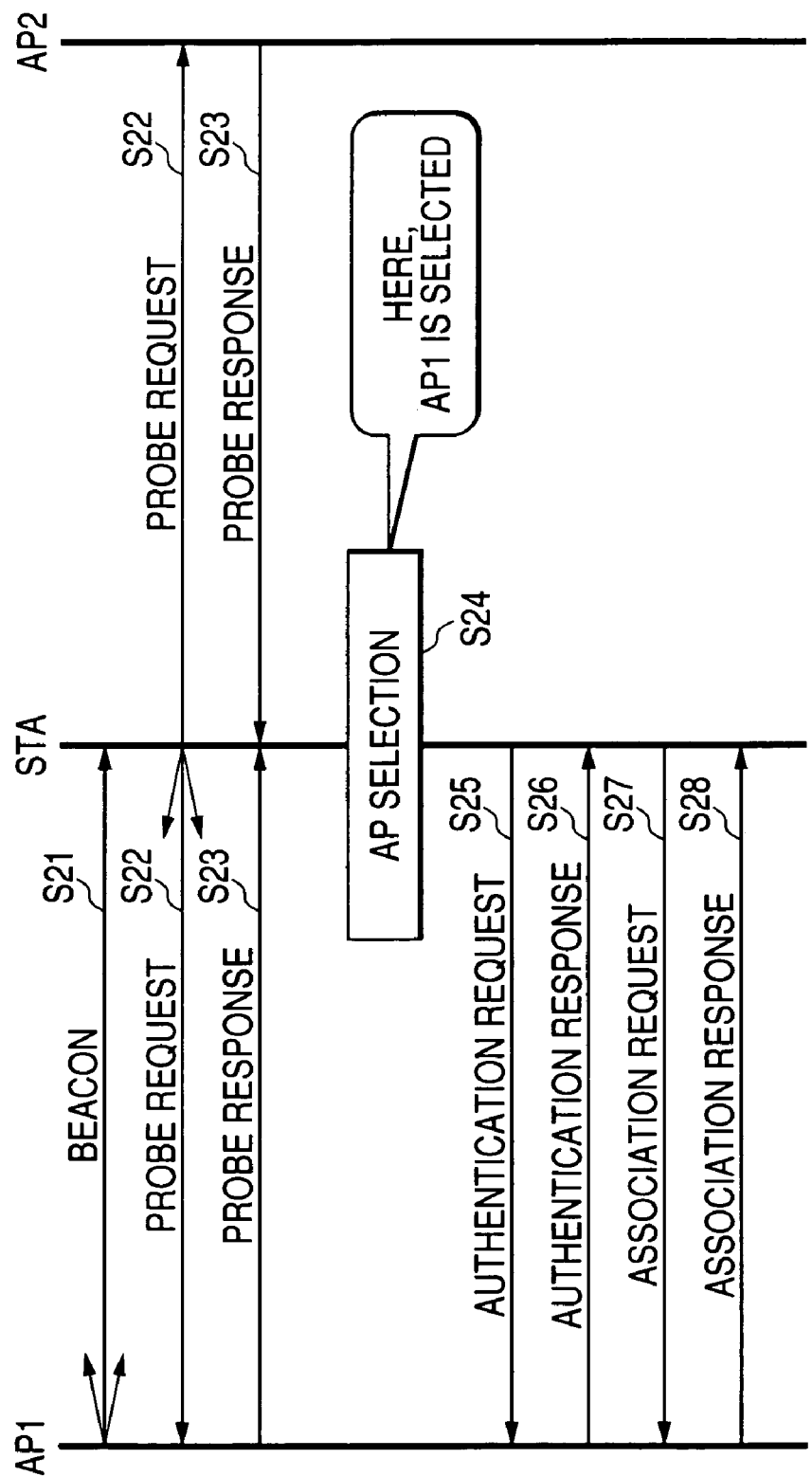
FIG. 10 is a flowchart to describe an example of communication processing of the wireless communication apparatus (AP and STA) according to the embodiment.
Figure 11:
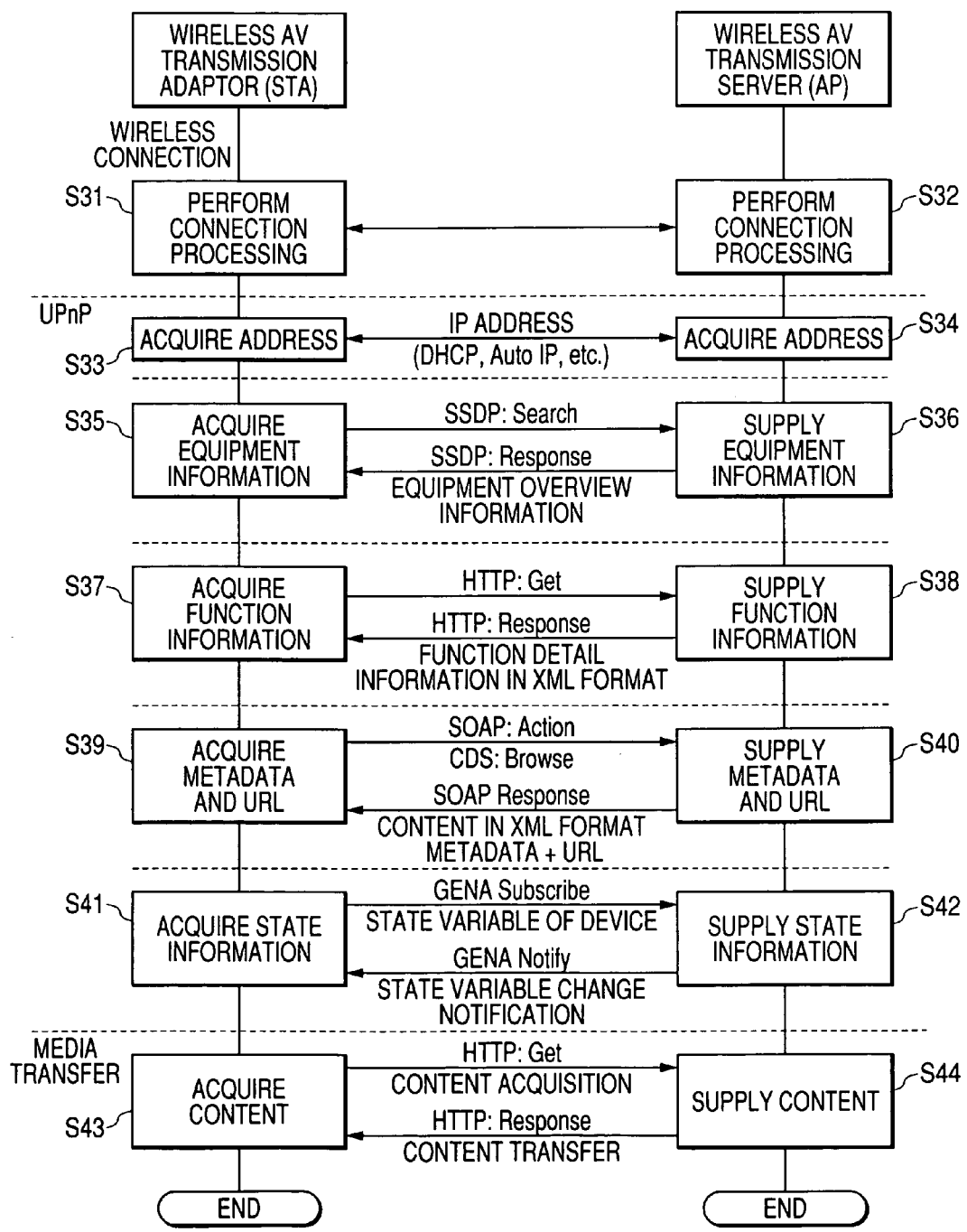
FIG. 11 is a flowchart to show an example of a procedure until content transmission and reception based on UPnP (universal plug and play) according to the embodiment.
Figure 20:
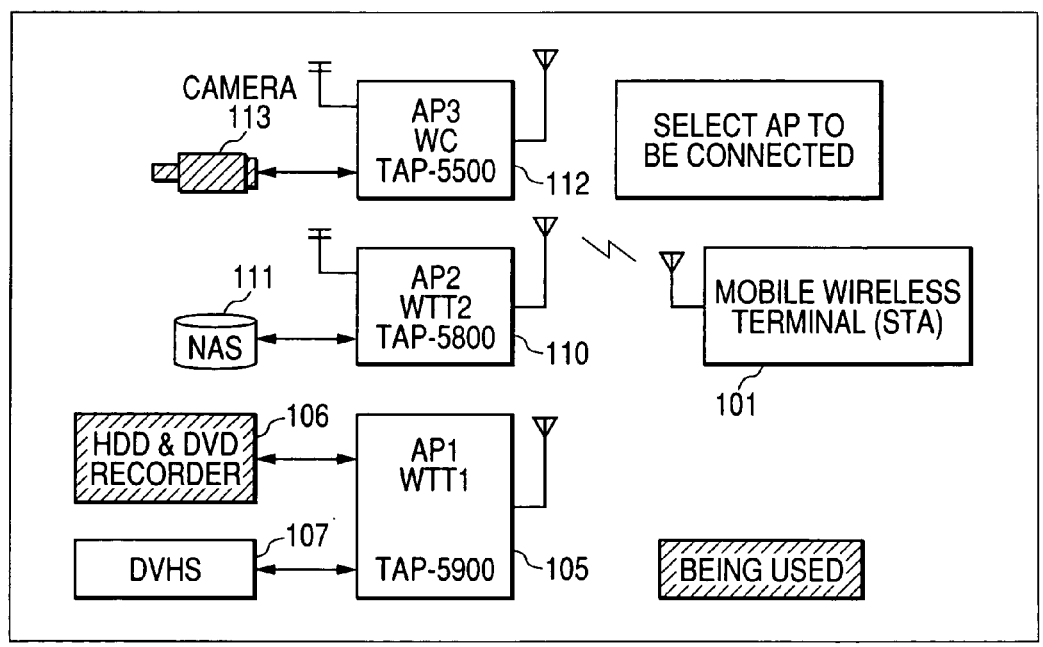
FIG. 20 is a schematic representation to show an example of a monitor screen of the wireless communication apparatus (STA) according to the embodiment.

FIG. 7 is a block diagram to show an overview example of the functions of the wireless communication apparatus (AP) according to the embodiment of the invention. FIG. 8 is a block diagram to show an overview example of the functions of the wireless communication apparatus (STA) according to the embodiment of the invention. FIG. 9 is a flowchart to show an overview of an example of communication processing of the wireless communication apparatus (AP and STA) according to the embodiment of the invention. FIG. 10 is a flowchart to describe an example of communication processing of the wireless communication apparatus (AP and STA) according to the embodiment of the invention. FIG. 11 is a flowchart to show an example of a procedure until content transmission and reception based on UPnP (universal plug and play) according to the embodiment of the invention. FIGS. 12 to 19 are drawings to show structure examples of the beacon frame used in communication processing of the wireless communication apparatus (AP) according to the embodiment of the invention. FIG. 20 is a schematic representation to show an example of a monitor screen of the wireless communication apparatus (STA) according to the embodiment of the invention.

Function of Wireless Transmission Server AP1

To being with, the functions of the wireless AV transmission server (AP1) 105 are overviewed with FIG. 7. The wireless AV transmission server (AP1) 105 has LED functions, tuner functions, MPEG functions, command functions, and further functions of Auto IP, UPnP, CGI & HTTP server, etc. The wireless AV transmission server (AP1) 105 further has an AP function 52 and an IEEE802.11 function 53 and performs scanning processing using the beacon frame described later.

Function of Wireless Transmission Adapter STA

Likewise, the functions of the wireless AV transmission adaptor (STA) 101 are overviewed with FIG. 8. The wireless AV transmission adaptor (STA) 101 has LED functions, OSD/GUI functions, MPEG functions, command functions, and further functions of Auto IP, UPnP, CGI & HTTP server, etc. The wireless AV transmission adaptor (STA) 101 further has an STA function 55 and an IEEE802.11 function 56 and performs scanning processing using the beacon frame described later.

Scanning Processing and Communication Processing

Next, scanning processing and communication processing between the wireless AV transmission server (AP1) 105 and the wireless AV transmission adaptor (STA) 101 will be discussed with the flowcharts of FIGS. 9 and 10.

In the flowcharts of FIGS. 9 and 10, the wireless AV transmission server (AP1) 105 and the wireless AV transmission adaptor (STA) 101 are started at a distance at which they can communicate with each other, whereby each performs the scanning processing by each CPU 10 and the MAC processing section 41 of the wireless transmission processing section 21. The wireless AV transmission server (AP1) 105 performs active scanning processing and the wireless AV transmission adaptor (STA) 101 performs passive scanning processing (S11).

Specifically, when the wireless AV transmission server (AP1) 105 is started, the CPU 10 and the MAC processing section 41 of the wireless transmission processing section 21 first collect equipment identification information (product name), manufacturing number information, equipment function information, and information of the resource use state, etc., and form the information as SSID and option information element in beacon frames as shown in FIGS. 12 to 19. Next, the beacon frames are encrypted in the MAC processing section 41, etc., and then are output through the signal path of the base band processing section (demodulation section) 42 to the high power amplifier 50.

On the other hand, when the wireless AV transmission adaptor (STA) 101 is started, likewise, the CPU 10 and the MAC processing section 41 of the wireless transmission processing section 21 perform scanning processing (S11, S12). The transmitted beacon frame is input via the antenna through the signal path of the low noise amplifier 31 to the base band processing section (demodulation section) 40 to the MAC processing section 41, and the encrypted beacon frame is decrypted to reproduce the beacon frame. Further, from the beacon frame, the equipment identification information (product name), the manufacturing number information, the equipment function information, and the information of the resource use state, etc., described above are extracted as in an example of a cache table shown in FIG. 13.

The scanning processing may be performed in conjunction with UPnP (Universal Plug And Play) shown in FIG. 11. As shown in FIG. 10, in addition to spontaneous beacon transmission from the wireless AV transmission server (AP1) 105, the wireless AV transmission adaptor (STA) 101 may aggressively transmit a probe request signal to acquire a beacon frame (S22) and may receive a probe response signal having a similar structure and information to the beacon frame structure described later for acquiring the information (S22, S23).

After the above process, in the wireless AV transmission adaptor (STA) 101, the CPU 10, etc., processes the information and generates image information of an operation screen as shown in FIG. 20 responsive to the information.

That is, on the operation screen in FIG. 20, the image information is displayed graphically based on the equipment identification information (product name), the manufacturing number information, the equipment function information, and the information of the resource use state, etc., of the wireless AV transmission servers (AP1 to AP3); for example, it is displayed on the digital TV 104 in FIG. 2. Here, for example, it is displayed in such a manner that the camera 113 being used and the HDD/DVD recorder 106 being used can be identified.

The user selects the wireless AV transmission server (AP1 to AP3) to be connected by issuing an operation command with PC, etc., or issuing an operation command through an operation section (not shown) via the Ethernet (registered trademark) I/F section 20, etc., in response to user's desire (S13, S24). Authentication request and authentication response processing (S14, S25, S26), association request and association response (S15, S27, S28), and user authentication/encryption key delivery (S16) are executed. Then, transmission processing of information of content, etc., from the selected wireless AV transmission server (AP1 to AP3) to the wireless AV transmission adaptor (STA) 101 is performed.

UPnP Processing

Next, UPnP processing that can be performed in parallel with or independently of the scanning processing will be discussed supplementary. That is, when connection processing is performed initially between the wireless AV transmission adaptor (STA) and the wireless AV transmission server (AP) (S31, S32), as the UPnP processing, the IP addresses are exchanged (S33, S34) and equipment information (S35, S36), function information (S37, S38), metadata (S39, S40), and state information (S41, S42) are acquired.

After the information pieces are exchanged, content information is supplied between the wireless AV transmission adaptor (STA) and the wireless AV transmission server (AP). However, in the UPnP processing, unlike the scanning processing described above, the user does not operate connection processing, etc., and the equipment identification information (product name), the manufacturing number information, the equipment function information, and the information of the resource use state, etc., of the wireless AV transmission servers (AP1 to AP3) cannot be obtained and are not displayed on the operation screen as shown in FIG. 20 either.

Beacon Frame Structure Examples

Figure 12:
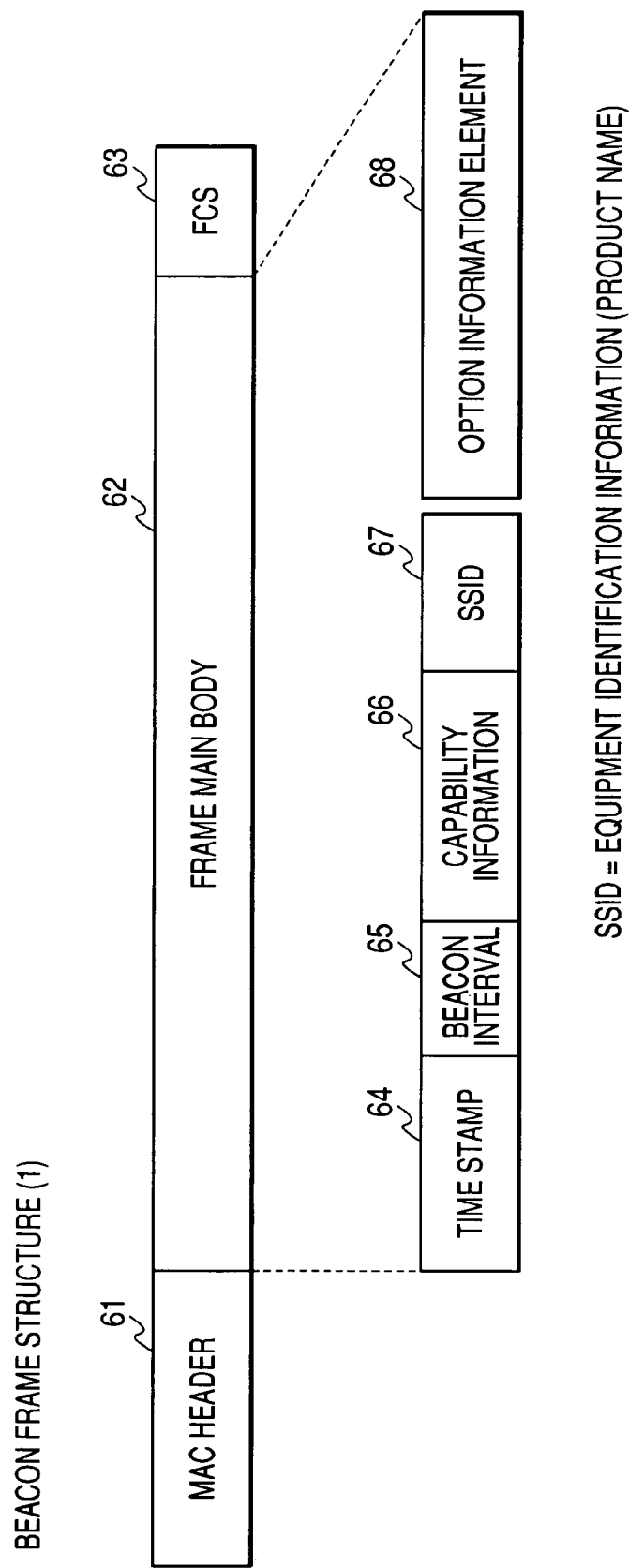
FIG. 12 is a drawing to show a structure example of a beacon frame used in communication processing of the wireless communication apparatus (AP) according to the embodiment.
Figure 13:
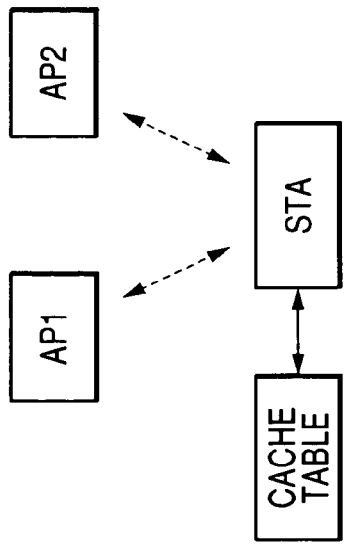
FIG. 13 is a drawing to show a structure example of a cache table based on the beacon frame used in communication processing of the wireless communication apparatus (AP) according to the embodiment.

Next, structure examples of beacon frame transmitted by the wireless AV transmission server (AP1), etc., will be discussed with FIGS. 12 to 19. Various beacon frame structures can be adopted. Here, as shown in FIG. 12, the beacon frame structure has a MAC header 61, a frame main body 62, and FCS 63. Further, the frame main body 62 has a time stamp 64, beacon interval 65, capability information 66, service set ID (SSID) 67, and an option information element 68. The example in FIG. 12 shows that the service set ID contains the equipment identification information (product name).

Figure 14:
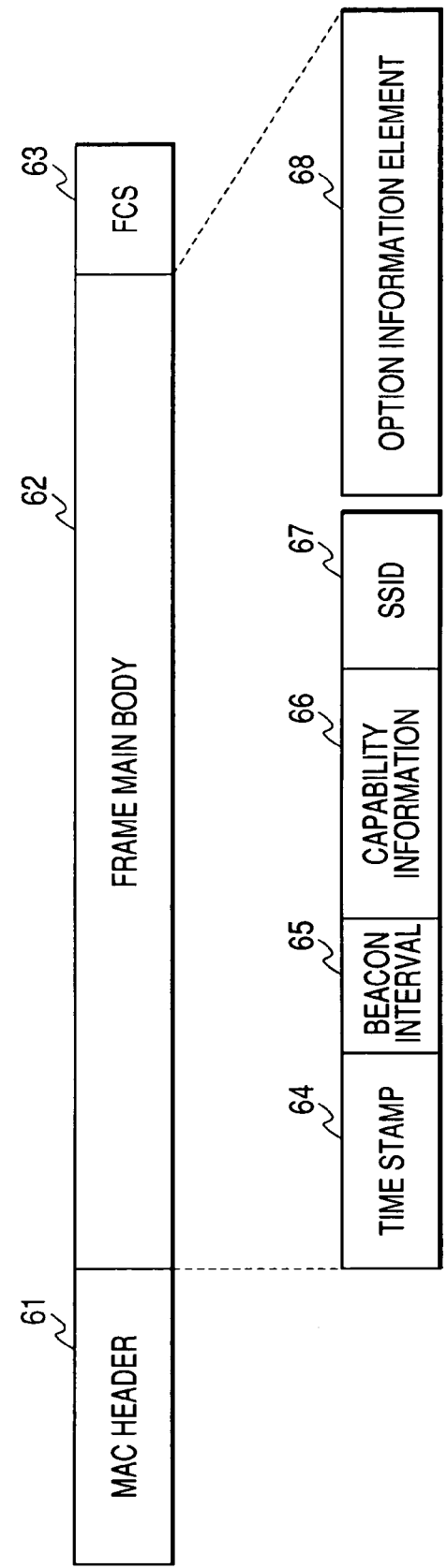
FIG. 14 is a drawing to show a structure example of the beacon frame used in communication processing of the wireless communication apparatus (AP) according to the embodiment.
Figure 15:
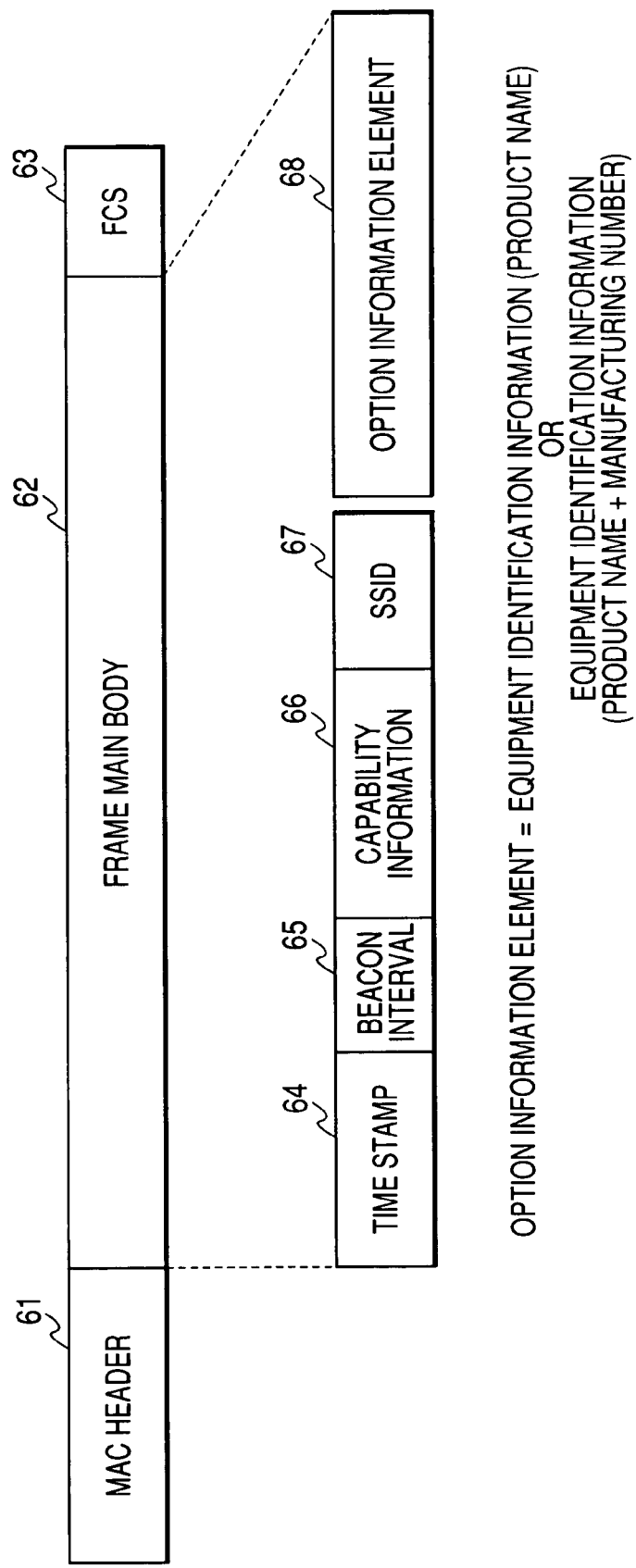
FIG. 15 is a drawing to show a structure example of the beacon frame used in communication processing of the wireless communication apparatus (AP) according to the embodiment.
Figure 16:
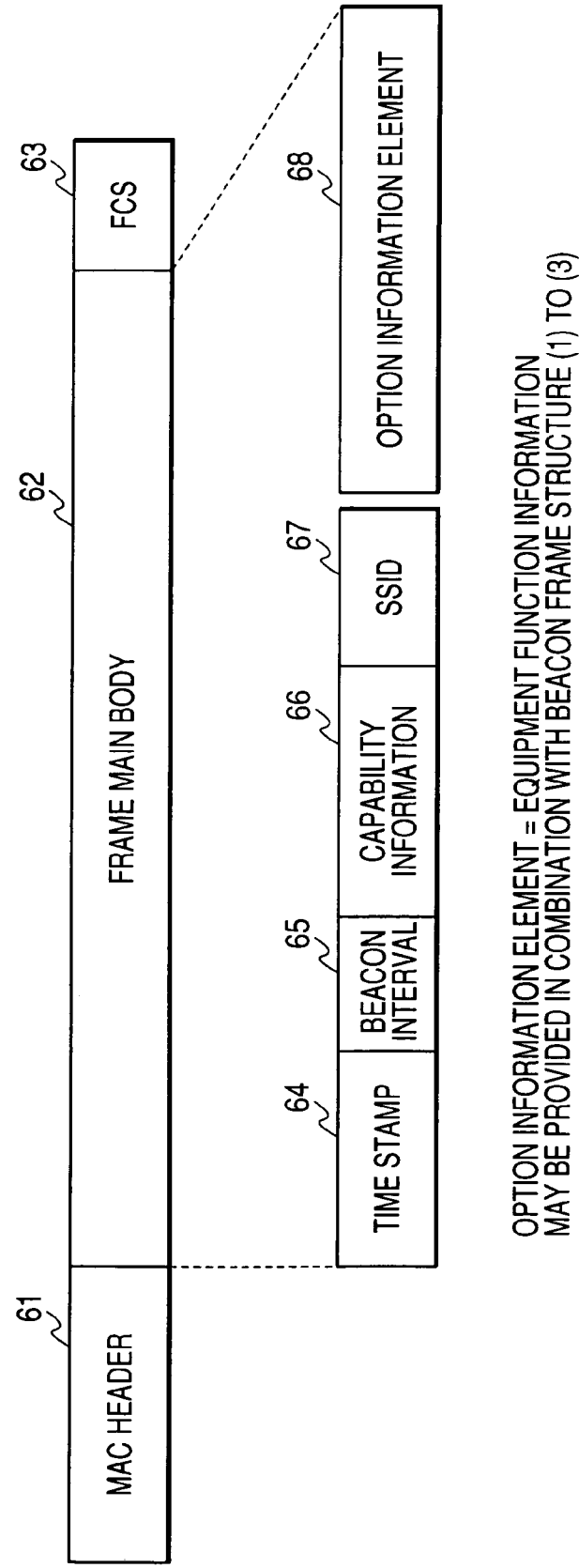
FIG. 16 is a drawing to show a structure example of the beacon frame used in communication processing of the wireless communication apparatus (AP) according to the embodiment.
Figure 17:
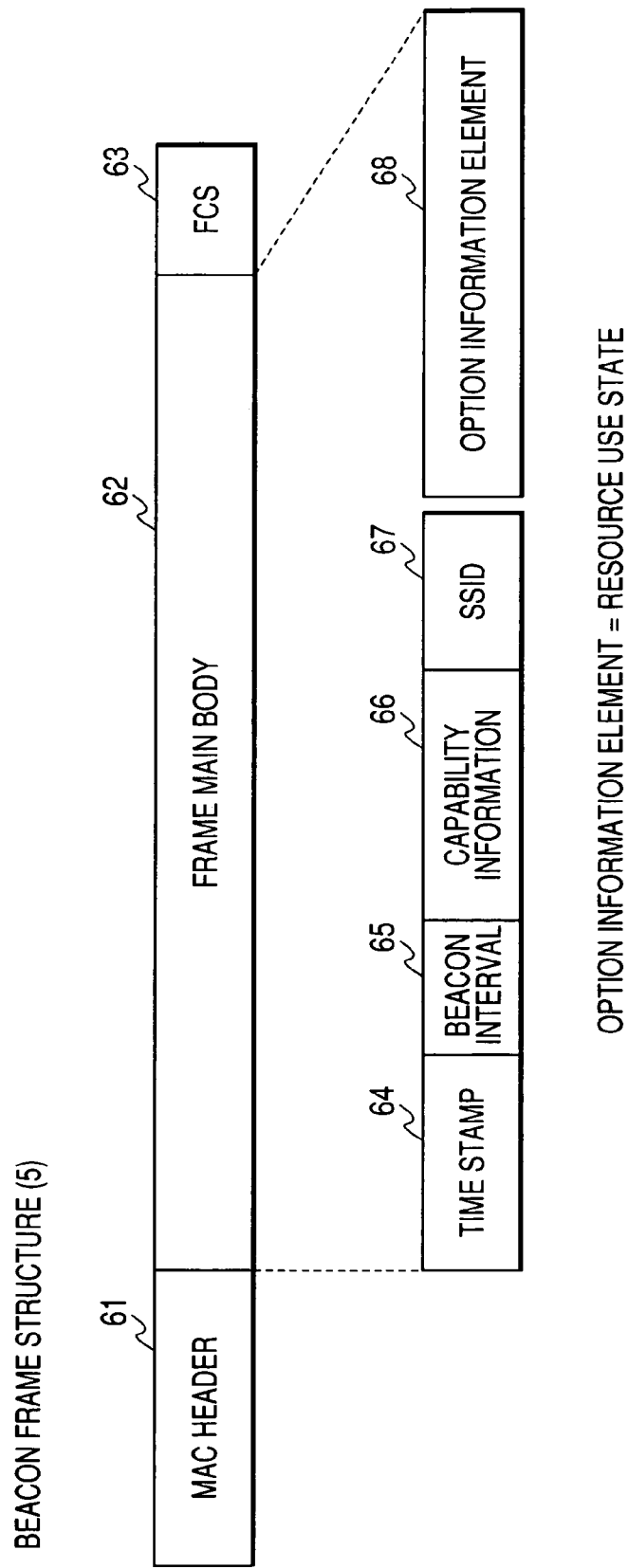
FIG. 17 is a drawing to show a structure example of the beacon frame used in communication processing of the wireless communication apparatus (AP) according to the embodiment.
Figure 18:
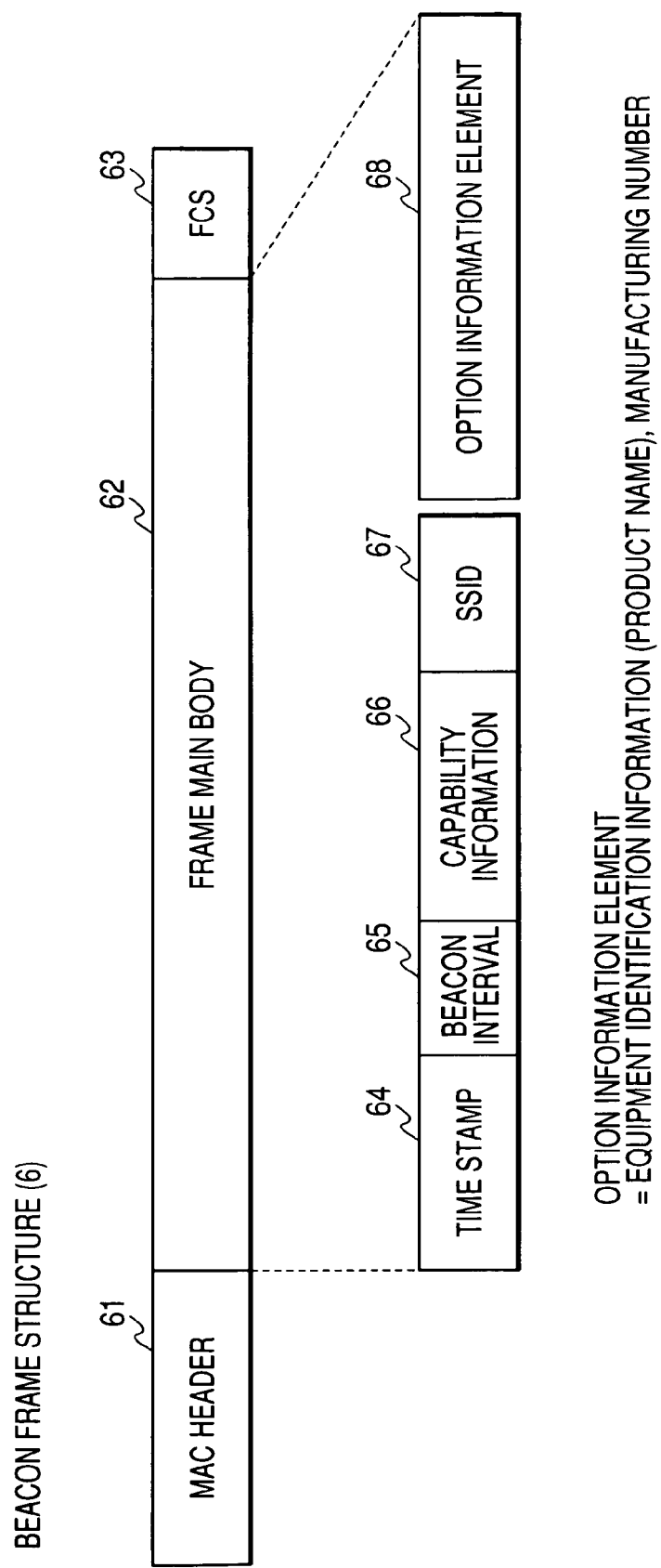
FIG. 18 is a drawing to show a structure example of the beacon frame used in communication processing of the wireless communication apparatus (AP) according to the embodiment.
Figure 19:
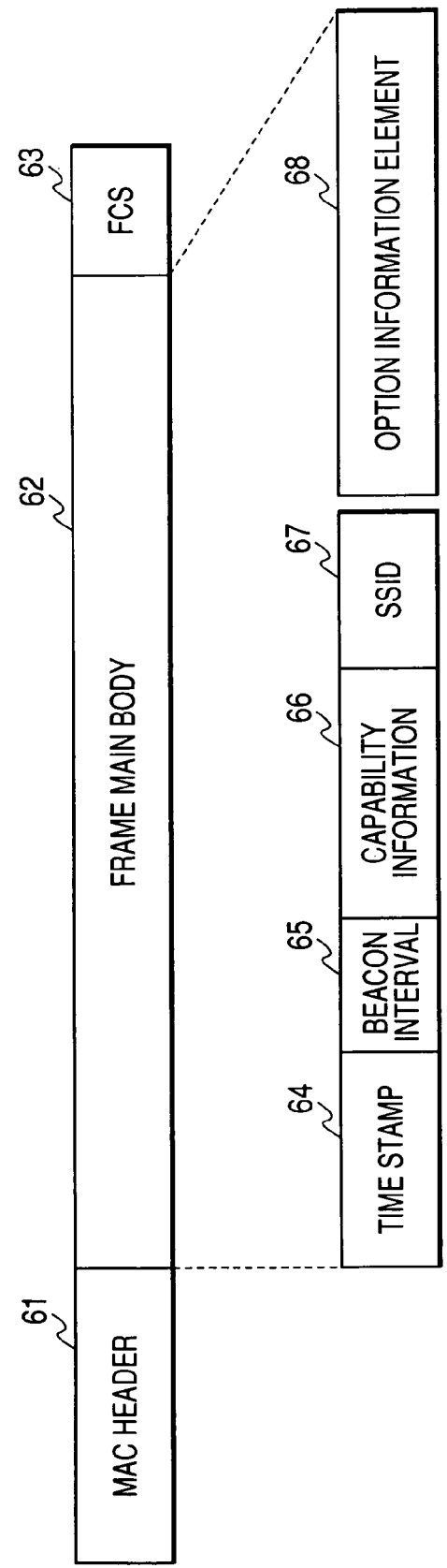
FIG. 19 is a drawing to show a structure example of the beacon frame used in communication processing of the wireless communication apparatus (AP) according to the embodiment.

Further, for example, in FIG. 14, the SSID contains the equipment identification information (product name) and the option information element contains the manufacturing number, the equipment function information, and the resource use state. In FIG. 15, the option information element contains the equipment identification information (product name) or the equipment identification information (product name and manufacturing number). In FIG. 16, the option information element contains the equipment function information and further may be provided in combination with the information pieces in FIG. 12, FIG. 14, FIG. 15. Further, in FIG. 17, the option information element contains the resource use state. Further, in FIG. 18, the option information element contains the equipment identification information (product name) and the manufacturing number. Further, in FIG. 19, the option information element contains the equipment identification information (product name), the manufacturing number, the equipment function information, and the resource use state.

Thus, it is made possible to contain various pieces of equipment information in the beacon frame structure in a large number of forms. As the scanning processing using the beacon frame structure is performed, it is made unnecessary for the user to conduct intricate operation of handling the wireless communication apparatus of the station STA to perform connection processing to the access points APs one at a time for collecting information concerning the access point AP to obtain information concerning a plurality of access points APs from the station STA as in the related art. Accordingly, the user can easily know the state of each of the access points APs using the operation screen shown in FIG. 20, etc., for example, and can also enter a command of connection with use of any desired equipment information.

Those skilled in the art can embody the invention according to the specific embodiment described above and further can easily make various modifications of the embodiment and can apply the invention to various embodiments without having any inventive ability. Therefore, the invention covers a wide scope not contradicting the disclosed principle or new features and is not limited to the embodiment described above.

In the wireless communication apparatus described above, for example, in communications between the wireless communication apparatus of the transmission party (access point AP) and the reception party (station STA) having the function of a wireless LAN, etc., used in a house, an office, etc., when the user of the wireless communication apparatus of the reception party (station STA) selects one of the wireless communication apparatus of the transmission parties (access points APs), a beacon frame of a radio signal carrying the equipment identification information, etc., is transmitted. Accordingly, it is made unnecessary for the user to conduct intricate operation of connecting to the access points APs one at a time from the station STA for collecting equipment information and determining which access point is placed in the user-desired state as in the apparatus in the related art.

That is, a beacon frame is transmitted from each of the access points and the station STA automatically scans the beacon frames and interprets them. Accordingly, the user can view the state of each of the access points on a screen of a digital TV, etc., to which a monitor signal is supplied from the station STA, for example, and can select the optimum access point out of the screen as desired.

The foregoing description of the embodiment of the invention has been presented for purposes of illustration and description. It is not intended to be exhaustive or to limit the invention to the precise form disclosed, and modifications and variations are possible in light of the above teachings or may be acquired from practice of the invention. The embodiment is chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A wireless communication apparatus comprising:
    a device interface that communicates with a local device and collects device information inherently associated with the local device;
    a communication unit that communicates with a communication equipment on a wireless network; and
    a control unit that controls the communication unit to transmit a beacon frame of a radio signal carrying a service set ID (SSID) and an option information element containing the device information to the communication equipment and to transmit content information to the communication equipment when a connection request is received from the communication equipment,
    wherein the device information includes equipment identification information, equipment function information, and information of resource use state.

2. The wireless communication apparatus according to claim 1, wherein the communication unit transmits the content information to the communication equipment after performing authentication.

3. The wireless communication apparatus according to claim 1, wherein the communication unit transmits the beacon frame at a predetermined interval without receiving from the communication equipment a request signal requesting to transmit the beacon frame.

4. The wireless communication apparatus according to claim 1, wherein the communication unit transmits the beacon frame to the communication equipment when a request signal is received from the communication equipment, the request signal requesting to transmit the beacon frame.

5. The wireless communication apparatus according to claim 1, wherein the communication unit transmits the device information that identifies the wireless communication apparatus being contained in a service set ID of the beacon frame.

6. The wireless communication apparatus according to claim 1, wherein the communication unit transmits at least one of the device information that identifies the wireless communication apparatus, a manufacturing number, equipment function information, and a resource use state, being contained in the option information element of the beacon frame.

7. The wireless communication apparatus according to claim 1, wherein the communication unit encrypts the beacon frame and transmits the encrypted beacon frame.

8. A method for providing a wireless communication with a communication equipment on a wireless network, the method comprising:
    communicating with a local device and collecting device information inherently associated with the local device;
    transmitting a beacon frame of a radio signal carrying a service set ID (SSID) and an option information element containing at least the device information to the communication equipment; and
    transmitting content information to the communication equipment when a connection request is received from the communication equipment,
    wherein the device information includes equipment identification information, equipment function information, and information of resource use state.

9. The method according to claim 8, further comprising performing authentication before transmitting the content information to the communication equipment.

10. The method according to claim 8, wherein the beacon frame is transmitted at a predetermined interval without receiving from the communication equipment a request signal requesting to transmit the beacon frame.

11. The method according to claim 8, wherein the content information contains the device information that identifies the wireless communication apparatus in the beacon frame.

12. The method according to claim 8, wherein the content information contains at least one of the device information that identifies the wireless communication apparatus, a manufacturing number, equipment function information, and a resource use state, as the option information element of the beacon frame.

* * * * *